United States Patent [19]
Miller

[11] Patent Number: 5,260,529
[45] Date of Patent: Nov. 9, 1993

[54] SENSING EDGE FOR A DOOR INCLUDING A SWITCH AND FLEXIBLE PROTRUDING SENSING MEMBERS

[75] Inventor: Bearge D. Miller, Concordville, Pa.

[73] Assignee: Miller Edge, Inc., Concordville, Pa.

[21] Appl. No.: 732,849

[22] Filed: Jul. 19, 1991

[51] Int. Cl.⁵ .............................................. H01H 3/16
[52] U.S. Cl. .................................................. 200/61.43
[58] Field of Search ....................... 200/61.43, 86 R; 49/488, 501, 26, 27

[56] References Cited

U.S. PATENT DOCUMENTS

| | | | |
|---|---|---|---|
| 1,511,055 | 10/1924 | Entwistle | 200/61.43 |
| 3,315,050 | 4/1967 | Miller | 200/61.43 |
| 3,462,885 | 8/1969 | Miller | 49/488 |
| 3,920,940 | 11/1975 | Brown et al. | 200/52 R |
| 4,532,388 | 7/1985 | Sackmann et al. | 200/61.43 |
| 4,684,768 | 8/1987 | Sackmann et al. | 200/61.43 |
| 4,785,143 | 11/1988 | Miller | 200/61.43 |
| 4,908,483 | 3/1990 | Miller | 200/61.43 |
| 5,079,417 | 1/1992 | Strand | 250/221 |
| 5,087,799 | 2/1992 | Pariot et al. | 200/61.43 |

Primary Examiner—J. R. Scott
Attorney, Agent, or Firm—Panitch Schwarze Jacobs & Nadel

[57] ABSTRACT

A sensing edge for causing a closing door to open by actuation of a device upon force being applied to the sensing edge includes an elongate outer sheath for being attached to a door. The sheath is fabricated of a material which is compressible upon application of an external pressure. An interior surface of the sheath defines an area for receiving a portion of a switch means. A pair of flexible members extend from the exterior surface of the sheath away from the door and toward one another. Mounting walls extend from a different portion of the exterior surface of the sheath for receiving an edge of the door.

22 Claims, 3 Drawing Sheets

SENSING EDGE FOR A DOOR INCLUDING A SWITCH AND FLEXIBLE PROTRUDING SENSING MEMBERS

FIELD OF THE INVENTION

The present invention relates to a sensing edge for a door and more particularly, to a sensing edge for a door that is easily mounted to an edge of the door and includes additional flexible members for providing enhanced sensitivity to the sensing edge.

BACKGROUND OF THE INVENTION

The use of sensing edges on doors is generally known. Sensing edges generally include a sheath having an area therein where at least a portion of a switch means is located. The sensing edge is attached to an edge of a door such that the sensing edge completely fills the gap between the edge of the door and an adjacent surface which is engaged by the door. Upon application of an external pressure to the sheath, such as by an obstructing article, the switch means is activated and operates to actuate suitable door control circuitry. The door control circuitry causes the door to open to prevent the obstructing article from being damaged by further closing of the door.

Generally, prior art sensing edges of this type require a localized deflection to operate the switching means. A substantial force or weight may not be sufficient to actuate the switching means if the force or weight is distributed over a large area of the sensing edge. In an attempt to overcome this problem, such switches often include internal protrusions for locally enhancing internal forces reacting to an external force. However, if the sensing edge is not properly mounted to the edge of the door, i.e., if the activation mechanism of the sensing edge is too close to the adjacent surface, the sensing edge will be mechanically actuated by the adjacent surface when the door is in a closed position even though the control circuitry prevents the door from opening. For instance, if the switching mechanism within the sensing edge is comprised of a pair of opposed flexible electrically conductive contacts, the contacts deflect toward each other each time the door closes. This causes the contacts to wear and decreases the life of the sensing edge.

In addition, many prior art sensing edges comprise a switch means located within an outer sheath which is sealed off by two end walls. Electrical wires are attached to the switch means and extend through a hole in one of the end walls to a power source. The exposed portion of the electrical wires are usually encased in an insulating sheath. The electrical wires are typically loosely mounted within the end wall thereby increasing the probability of the wires being ripped away from the switch means. In addition, because the wires are loosely mounted they did not form a tight seal with the outer sheath. Thus, moisture and small particles tended to enter the sensing edge, thereby lowering the sensitivity of the switch means.

Consequently, a need has arisen for a sensing edge which is highly sensitive to obstructing articles, but which is not sensitive to an adjacent surface when the door is in a closed position. There further exists a need for a sensing edge which can be adjustably mounted to the edge of a door such that the sensing edge completely fills the gap between the edge of the door and an adjacent surface despite irregularities in the adjacent surface. With respect to sensing edges that include a pair of opposed flexible electrically conductive contacts, a need has arisen for preventing the contacts from deflecting when the door is in the closed position and yet allows the sensing edge to fill the gap between the edge of the door and the adjacent surface engaged by the door.

The present invention is directed to a sensing edge for causing a closing door to open by actuation of a device upon force being applied to the sensing edge. The sensing edge of the present invention includes flexible members which prevent the switching means from being actuated when the door is a closed position, but which do not inhibit switching sensitivity when the sensing edge encounters an obstructing article. The flexible members also allow the sensing edge to completely fill the gap between the door edge and the adjacent surface engaged by the door without actuating the switching means within the sensing edge. Further, the sensing edge of the present invention comprises a mounting wall which allows the sensing edge to be adjustably mounted onto an edge of a door such that the sensing edge completely fills the gap between the edge of the door and the adjacent surface engaged by the door.

SUMMARY OF THE INVENTION

Briefly stated, the present invention comprises a sensing edge for causing a closing door to open by actuation of a device upon force being applied to the sensing edge. The sensing edge comprises an elongate outer sheath having a first wall and a second wall. The first and second walls each have a first end and a second end. The first end of the first wall is connected to the first end of the second wall. The second end of the first wall is connected to the second end of the second wall. Each of the walls include an interior surface and an exterior surface such that the interior surfaces of the walls define an area for receiving a portion of a switch means. The first wall includes a first portion fabricated of a first material and a second portion fabricated of a second material. The second material is less flexible than the first material. The first wall includes a first protruding means and a second protruding means extending from the exterior surface thereof for receiving the edge of the door. The second wall is compressible upon application of an external pressure and fabricated of a flexible air impervious material. Switch means are positioned within the area for actuation of the device upon application of external pressure to the outer sheath.

Preferably, a pair of flexible members extend from the exterior surface of the sheath away from the door and toward one another. Each flexible member has an inner surface, an outer surface, a first end and a second end.

An additional embodiment is directed to a method for attaching such a sensing edge to an edge of a door. The method comprises the steps of providing such a sensing edge and positioning the sensing edge on the edge of the door such that the portion of the exterior surface of the sheath is in facing engagement with the edge of the door and the door is positioned proximate the protruding means. A fastener is positioned through at least one of the slots into engagement with the door such that the sensing edge can move with respect to the door edge. The door is positioned in a generally closed position such that the door edge is proximate a surface. The position on the sensing edge is adjusted relative to the door so that a portion of the exterior surface of the sheath is in complementary engagement with the surface. The position of the fastener is adjusted with respect to the door such that the position of the sensing edge with respect to the door is fixed.

A further embodiment is directed to a sensing edge for causing a closing door to open by actuation of a device upon force being applied to the sensing edge. The sensing edge comprises an elongate outer sheath having a first end and a second end for being attached to an edge of a door. The sheath is fabricated of a material which is compressible upon application of external pressure. The sheath has an interior surface and an exterior surface. The interior surface of the sheath defines an area for receiving a portion of a switch means. The switch means is positioned within the area of the sheath for actuation of the device upon application of external pressure to the exterior surface of the sheath. The switch means has a first end and a second end and is positioned within the area of the sheath such that a gap is formed between the first end of the switch means and the first end of the outer sheath. Electrical conducting means is attached for controlling the actuation of the device in response to the application of force to the outer sheath. At least one end plug is complementarily positioned within the gap between the first end of the switch means and the first end of the outer sheath for sealing the first end of the outer sheath. The plug has a passageway formed therethrough. The electrical conducting means extends through and is positioned within the passageway such that the electrical conducting means is securely retained within the passageway.

BRIEF DESCRIPTION OF THE DRAWINGS

The foregoing summary, as well as the following detailed description of the preferred embodiment, will be better understood when read in conjunction with the appended drawings. For the purpose of illustrating the invention, there is shown in the drawings an embodiment which is presently preferred, it being understood, however, that the invention is not limited to the specific methods and instrumentalities disclosed. In the drawings.

DETAILED DESCRIPTION OF THE PREFERRED EMBODIMENTS

Figure 1:
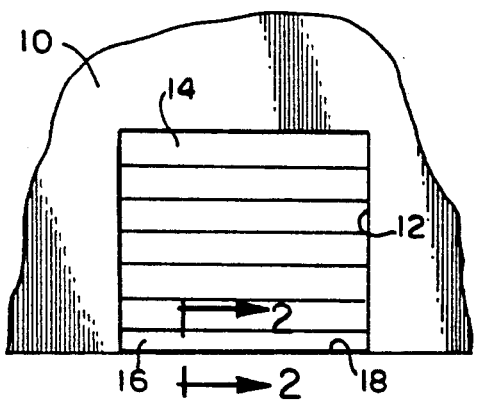
FIG. 1 is a front elevational view showing a door construction including a sensing edge in accordance with the present invention.

Certain terminology is used in the following description for convenience and is not limiting. The words "right," "left," "lower," and "upper" designate directions in the drawings to which reference is made. The words "inwardly" and "outwardly" refer to directions toward and away from, respectively, the geometric center of the sensing edge and designated parts thereof. The terminology includes the words above specifically mentioned, derivatives thereof and words of similar import.

Referring to the drawing in detail, wherein like numerals indicate like elements throughout, there is shown in FIG. 1, a building wall 10 having a doorway 12 provided with a door 14. While the door 14 illustrated is an overhead door having a sensing edge 16 in accordance with the present invention along its lower side or leading edge 18, it is within the spirit and scope of the invention to incorporate the sensing edge 16 described hereinafter along any edge of any door structure, such as vertically disposed or horizontally movable doors (not shown), as desired.

Figure 2:
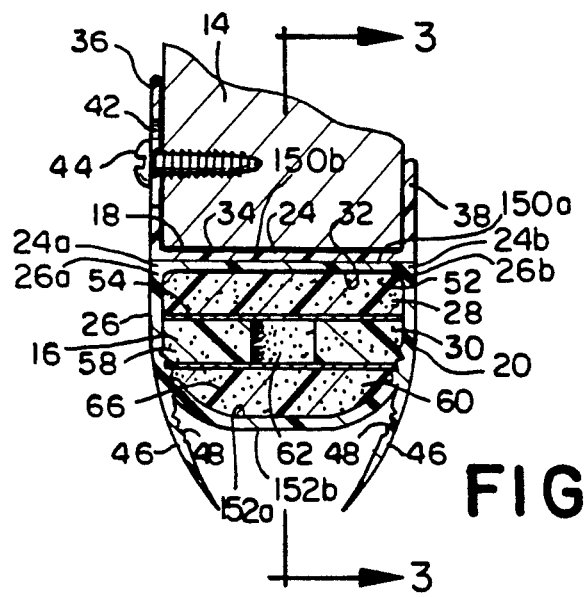
FIG. 2 is a greatly enlarged cross-sectional view of the sensing edge of FIG. 1 taken along line 2—2 of FIG. 1.

Referring now to FIG. 2, the sensing edge 16 extends substantially along the entire leading edge 18 of the door 14. The sensing edge 16 is comprised of an outer casing or sheath 20 of an elongate, generally constant cross-sectional outline configuration, extending closely along the leading edge 18 of the door 14. That is, the sheath 20 extends along an axis extending generally parallel to the leading door edge 18. In the presently preferred embodiment, the sheath 20 is generally of oval or elliptical cross-section, but may be of any other suitable cross-sectional shape, such as circular, semicircular, rectangular or square (not shown).

The sheath 20 includes a first wall 24 and a second wall 26 which is generally U-shaped in cross-section. The first wall 24 has a first end 24a and a second end 24b. The second wall 26 has a first end 26a and a second end 26b. In the preferred embodiment, the first end 24a of the first wall 24 is connected to the first end 26a of the second wall 26, and the second end 24b of the first wall 24 is connected to the second end 26b of the second wall 26 to form a generally continuous sheath. However, it is to be understood by those skilled in the art that any number of walls could be used to make up the sheath, such as, but not limited to, one or three or more walls. The ends of the first and second walls may be integrally connected to one another, such as by soldering or the sheath can be formed as one unit, such as by injection molding or blow molding.

The first wall 24 includes an interior surface 150a and an exterior surface 150b. The second wall 26 also includes an interior surface 152a and an exterior surface 152b. The interior surfaces 150a, 152a of the first and second walls 24, 26 at least partially define an area 28 for receiving at least a portion of a switch means 30, described hereinafter. The first wall 24 includes a first portion 32 fabricated of a first material and second portion 34 fabricated of a second material. The first material is preferably more flexible than the second material. In the preferred embodiment, the first material is preferably a flexible air impervious material, such as Santoprene 101-55 made by Monsanto. The second material is preferably Santoprene 103-50 also made by Monsanto. The second wall 26 can also fabricated of the first material such that it is compressible upon application of an external pressure, such as engagement with an obstructing article. However, it is to be understood by those skilled in the art that the second wall could be fabricated out of a different material than the first portion 32 of the first wall 24.

The first wall 24 further includes first and second protruding means which extend from the exterior surface of the first wall 24 for receiving an edge 18 of the door 14. In the preferred embodiment, the first protruding means is a first mounting wall 36 and the second protruding means is a second mounting wall 38. The first and second mounting walls 36, 38 are preferably fabricated of the second material. In the preferred embodiment, the first mounting wall 36 extends further away from the second wall 26 than the second mounting wall 38. The first mounting wall 36 is preferably generally parallel to and spaced apart from the second mounting wall 38 a sufficient distance for complementarily receiving the door edge 18. As discussed above, the first and second mounting walls 36, 38 can be received by any edge of the door, depending upon the type of door upon which the sensing edge 16 is being mounted.

Figure 4:
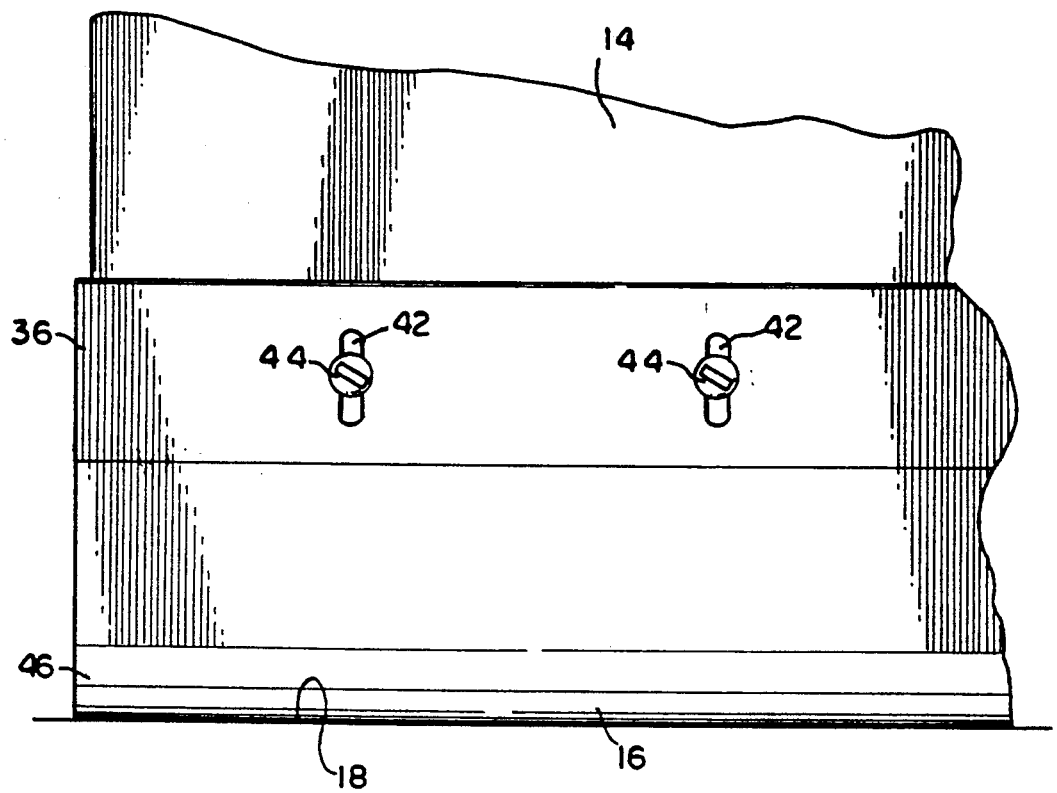
FIG. 4 is a greatly enlarged rear elevational view of the lower end of a portion of the door and sensing edge of FIG. 1.

The first mounting wall 36 extends outwardly from the first wall 24 for engagement with the door 14. In the present embodiment, the first mounting wall 36 abuts one surface, preferably the interior surface, of the door 14. The first mounting wall 36 includes at least one slot 42 such that a fastener 44 can be adjustably positioned through the slot 42 and into engagement with the door 14 for adjustably mounting the sensing edge 16 on the door edge 18. In the preferred embodiment, the slot 42 which is best shown in FIG. 4, is preferably generally oblong in shape, but may be of any other suitable shape, such as circular, square, rectangular or hexagonal (not shown). The fastener 44 is preferably a screw, but can be any type of suitable fastener, such as a bolt, nail or tack.

Preferably, a plurality of slots 42 are equally spaced along the entire length of the sheath 20. It is understood by those skilled in the art, that the present invention is not limited to any particular number or spacing of slots 42 in the first mounting wall 36. It is further understood that the present invention is not limited to locating the slots 42 in any particular configuration or any particular orientation in the first mounting wall 36. For instance, the slots 42 could be located such that the length of the slot is perpendicular to the first wall 24 or the slot 42 could be orientated such that the length of the slot 42 is parallel with the first wall 24. Further, the slots 42 could be located in both the first mounting wall 36 and the second mounting wall 38 without departing from the spirit and scope of the invention. Likewise, the slots 42 could be located only in the second mounting wall 38.

Further referring to FIG. 2, a pair of flexible members 46 extend from the exterior surface of the second wall 26 away from the door 14 and toward one another. In the present embodiment, the flexible members 46 are preferably fabricated of the first material. Each flexible member 46 has an inner surface and outer surface, a first end connected to the exterior surface of the second wall 26 and a second end.

In the preferred embodiment, the flexible members 46 gradually decrease in thickness from the first end adjacent to the second wall 26 to the opposite, second end. However, the flexible members could alternatively increase in thickness from the first end to the second end or could be uniform in thickness. It is to be understood by those skilled in the art that the flexible members are directed toward one another either in a generally arcuate manner or the flexible members 46 could be straight and angled toward one another. The flexible members 46 are preferably constructed to be sensitive enough to allow the sensing edge 16 to detect an obstructing article but flexible enough to abut an adjacent surface (not shown) when the door 14 is in a closed position without actuating the sensing edge.

Figure 5:
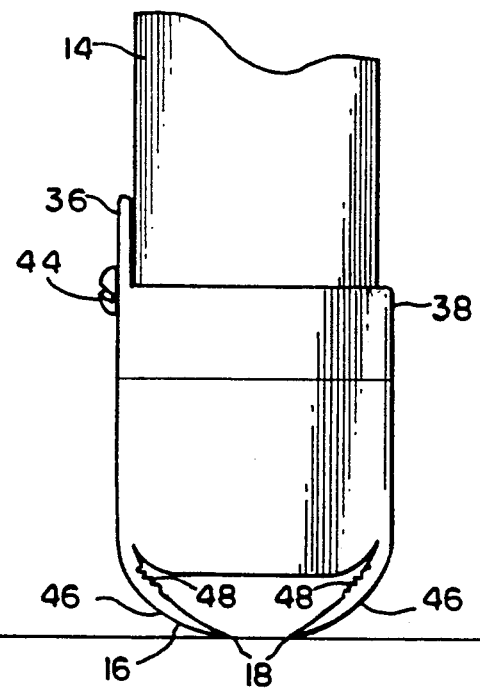
FIG. 5 is an enlarged side elevational view of the lower portion of the door and sensing edge of FIG. 1.

When the door 14 is in a closed position, the flexible members 46 bend toward one another as illustrated in FIG. 5 and form a seal between the sensing edge and the adjacent surface. The seal prevents air currents from entering or exiting through the gap created between the door edge 18 and the surface. This is desirable to the owner in terms of energy costs and efficiency by preventing the escape of heated or cooled air. In addition, the flexible members 46 are capable of forming a tight seal beneath the sensing edge 16 without causing the switch means to be actuated. That is the flexible members 46 apply minimal pressure to the sensing edge 16 when the door is in a closed position. This results in increasing the life of the sensing edge because the switching means is not mechanically actuated each time the door is placed in the closed position.

At least one groove 48 is positioned each of the flexible members 46 to increase the flexibility of each flexible member 46. In the present embodiment, the groove 48 is positioned on the inner surface or facing surfaces of the flexible members 46. However, it is understood by those skilled in the art, that the grooves 48 may be eliminated or that the grooves 48 may be positioned on the outer surface of the flexible members 46 if desired.

It is understood by those skilled in the art, that the present invention is not limited to any particular number of grooves 48 in the flexible members 46. It is further understood that the grooves 48 can be of any particular shape, such as V-shaped, semicircular shaped or any other suitable shape without departing from the spirit and scope of the invention.

Figure 3:
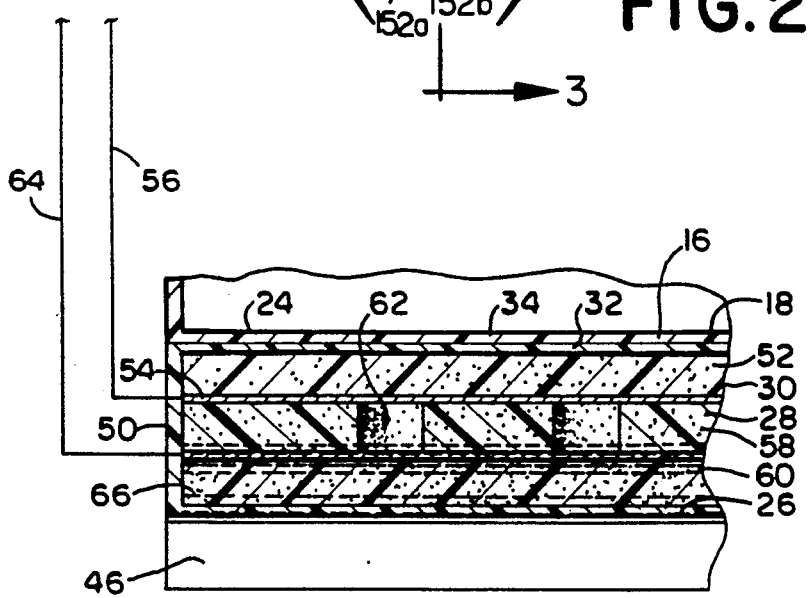
FIG. 3 is a cross-sectional view of the sensing edge of FIG. 2 taken along line 3—3 of FIG. 2.

Now referring to FIGS. 2 and 3, an end wall 50 (only one shown) closes and seals each end of the sheath 20 to thereby form the enclosed area 28 for receiving at least a portion of a switch means for actuation of a device (not shown) upon application of external pressure to the sheath 20. Alternatively, it is to be understood by those skilled in the art that an end plug could be used instead of the end wall 50 to seal each end of the sheath 20.

The switch comprises a first sheet of resiliently compressible material 52 which is positioned within the area 28 and includes a first face and a second face. The first face of the first sheet of resiliently compressible material 52 is in engagement with the interior surface of the first wall 24.

In the present embodiment, it is preferred that the first sheet of resiliently compressible material 52 and succeeding layers and sheets described hereinafter, be generally sized to complement the internal configuration of the area 28. However, it is understood by those skilled in the art, that the first sheet of resiliently compressible 52 and succeeding layers and sheets can be sized as wide or narrow as desired, and may be of any desired length for accommodating different structures and uses.

In the present embodiment, it is preferred that the first sheet of resiliently compressible material 52 be constructed of generally soft foam rubber. It is understood by those skilled in the art, that the first sheet of resiliently compressible material 52 can be constructed of either closed or open-cell foam rubber or other material having similar properties.

Just below (when viewing FIGS. 2 and 3) the first sheet of resiliently compressible material 52 is a first sheet of flexible electrically conductive material 54, engaged therewith, and having a first face and a second face. The first face of the first sheet of flexible, electrically conductive material 54 is in engagement with the second face of the first sheet of resiliently compressible material 52. In the present embodiment, it is preferred that the first sheet of flexible, electrically conductive material 54 be generally thin and preferably be constructed of aluminum or aluminum foil. However, it is within the spirit and scope of the invention to construct the first sheet of flexible, electrically conductive material 54 of other conductive materials, such as copper, brass or an alloy thereof.

As shown in FIG. 3, an electrical conductor or wire 56 is electrically connected to the first sheet of flexible, electrically conductive material 54 preferably by soldering at one end thereof. The electrical conductor 56 is used in connection with a circuit (not shown) for controlling the actuation of the device, as it is understood by those skilled in the art, in response to the application of force to the sheath 20, as described hereinafter.

The first sheet of flexible, electrically conductive material 54 is in engagement with a layer of non-conductive material 58 having a first face and a second face for spacing apart the first sheet of flexible, electrically conductive material 54 and a second sheet of flexible, electrically conductive material 60. The layer of non-conductive material 58 has a least one opening extending therethrough between the first and second faces thereof. As shown in FIG. 3, the layer of non-conductive material 58, preferably includes a plurality of openings 62 interspersed therealong for allowing the actuation of the switch (not shown) by applying pressure thereto, as described hereinafter. In the present embodiment, it is preferred that the openings 62 be generally oval shaped in cross-section. However, it is within the spirit and scope of the invention to configure the openings 62 to be of any geometric shape, such as square or circular.

The layer of non-conductive material 58 is preferably constructed of generally soft foam rubber. It is understood by those skilled in the art, that the layer of non-conductive material 58 can be constructed of either closed or open-cell foam rubber or other materials having similar properties, so long as the function of the switch is achieved, as described hereinafter.

The layer of non-conductive material is in engagement with the second sheet of flexible, electrically conductive material 60 having a first face and a second face. The first face of the second sheet of flexible, electrically conductive material 60 is in engagement or corresponding facing relationship with the second face of the layer of non-conductive material 58.

In the present embodiment, it is preferred that the second sheet of flexible, electrically conductive material 60 be constructed of the same material and configuration as the first sheet of flexible, electrically conductive material 54. Similarly, the second sheet of flexible, electrically conductive material 60 is connected to an electrical conductor or wire 64 for connection with the circuit for controlling the actuation of the device in response to the application of force to the sheath 20.

In engagement with the second sheet of flexible, electrically conductive material 60 is a second sheet of resiliently compressible material 66 having a first face and a second face. The first face of the second sheet of resiliently compressible material 66 is in engagement or corresponding facing relationship with the second face of the second sheet of flexible, electrically conductive material 60. The second face of the second sheet of resiliently compressible material 66 is in engagement with the inner surface of the lower portion of the second wall 26.

The second sheet of resiliently compressible material 66 is preferably constructed of the same material and configured generally identically to the first sheet of resiliently compressible material 52. However, it is apparent to those skilled in the art, that the first and second sheets of resiliently compressible material 52, 66 can differ in configuration, size and/or material.

As shown in FIG. 3, the first and second sheets of flexible, electrically conductive material 54, 60, are spaced apart by the layer of non-conductive material 58 and present equal portions to each other through the openings 62. Upon the application of force to the sheath 20, a portion of at least one of the first and second sheets of flexible, electrically conductive material 54, 60 deflects into at least one of the openings 62 in the layer of non-conductive material 58, and makes electrical contact between the first and second sheets of flexible, electrically conductive material 54, 60 to thereby close or open an electrical circuit to actuate the device.

The sensing edge 16, described above, is preferably attached to the edge 18 of the door 14 in the following manner. The sensing edge 16 is positioned on the edge 18 of the door 14 such that a portion of the exterior surface of the sheath 20 is in a facing engagement with the edge 18 of the door 14, and the door 14 is positioned between the mounting walls 36, 38, respectively. In the preferred embodiment, the exterior surface of the first wall 24 is in facing engagement with the edge 18 of the door 14 and the width of the sensing edge generally corresponds to the thickness of the door so that the protruding mounting walls 36, 38 engage the corresponding interior and exterior door surfaces. However, it is understood by those skilled in the art, that any exterior surface of the sheath 20 could be in facing engagement with the edge 18 of the door 14. A fastener 44 is positioned through at least one of the slots 42 (and preferable in multiple slots) and into engagement with the door 14 such that the sensing edge 16 can move at least slightly up and down with respect to the door edge 18. That is, it is preferred that the fastener be mounted in the door 14 such that the first mounting wall 36 can be adjustably positioned with respect to the door. The door 14 is then positioned in a generally closed position. The sensing edge 16 is adjusted along the length of the door edge 18 so that the sensing edge 16 fills any gap between the door edge and an adjacent surface (not shown). Typically, the gap formed between the door edge 18 and the adjacent surface is not uniform in width along its length because the adjacent surface is not always level. This can be caused by the surface being located on an inclination or by the surface being uneven. It is understood by those skilled in the art that the surface is preferably the ground, that can be a floor or any other suitable surface. The position of the sensing edge 16 is adjusted relative to the door 14 so that the flexible members 46 are in complementary engagement with the surface along the entire length of the door. In the preferred embodiment, the flexible members 46 fold under the sensing edge 16 such that any gap between the surface and the door edge 18 is completely filled without actuating the sensing edge 16. In some situations, it may be necessary to adjust some portions of the sensing edge 16 downwardly and in other situations upwardly depending upon local variations in the height of the adjacent surface. After the height of the sensing edge 16 has been adjusted along its entire length, the fastener 44 (or plurality of fasteners) is then adjusted with respect to the door 14 so that the position of the sensing edge 16 with respect to the door 14 is fixed. In the present embodiment, it is preferred that there not be excessive pressure on the flexible members 46 by the surface when the door 14 is in a closed position so that the sensing edge 16 is not actuated when engaging the surface.

Figure 6:
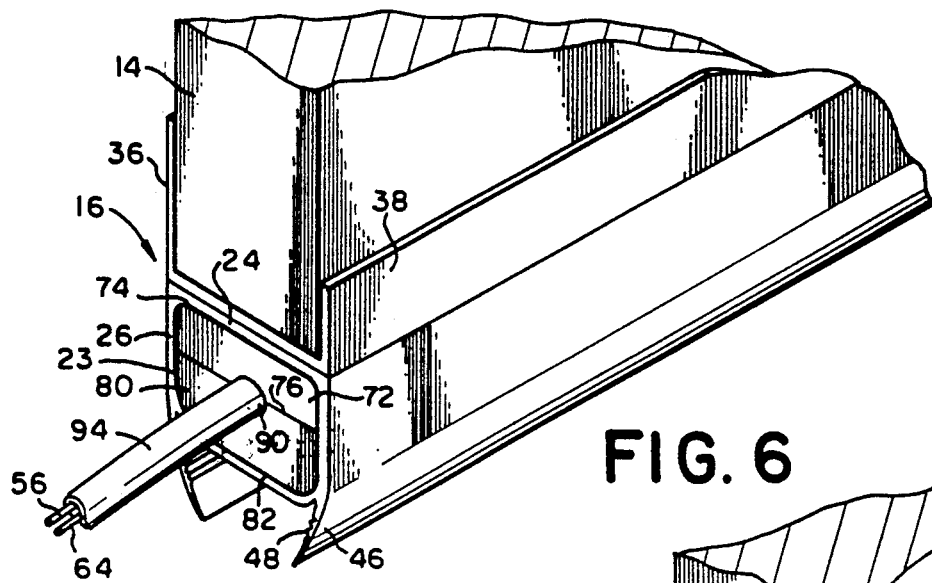
FIG. 6 is a partial perspective view of the sensing edge of FIG. 1 which includes an end plug.
Figure 7:
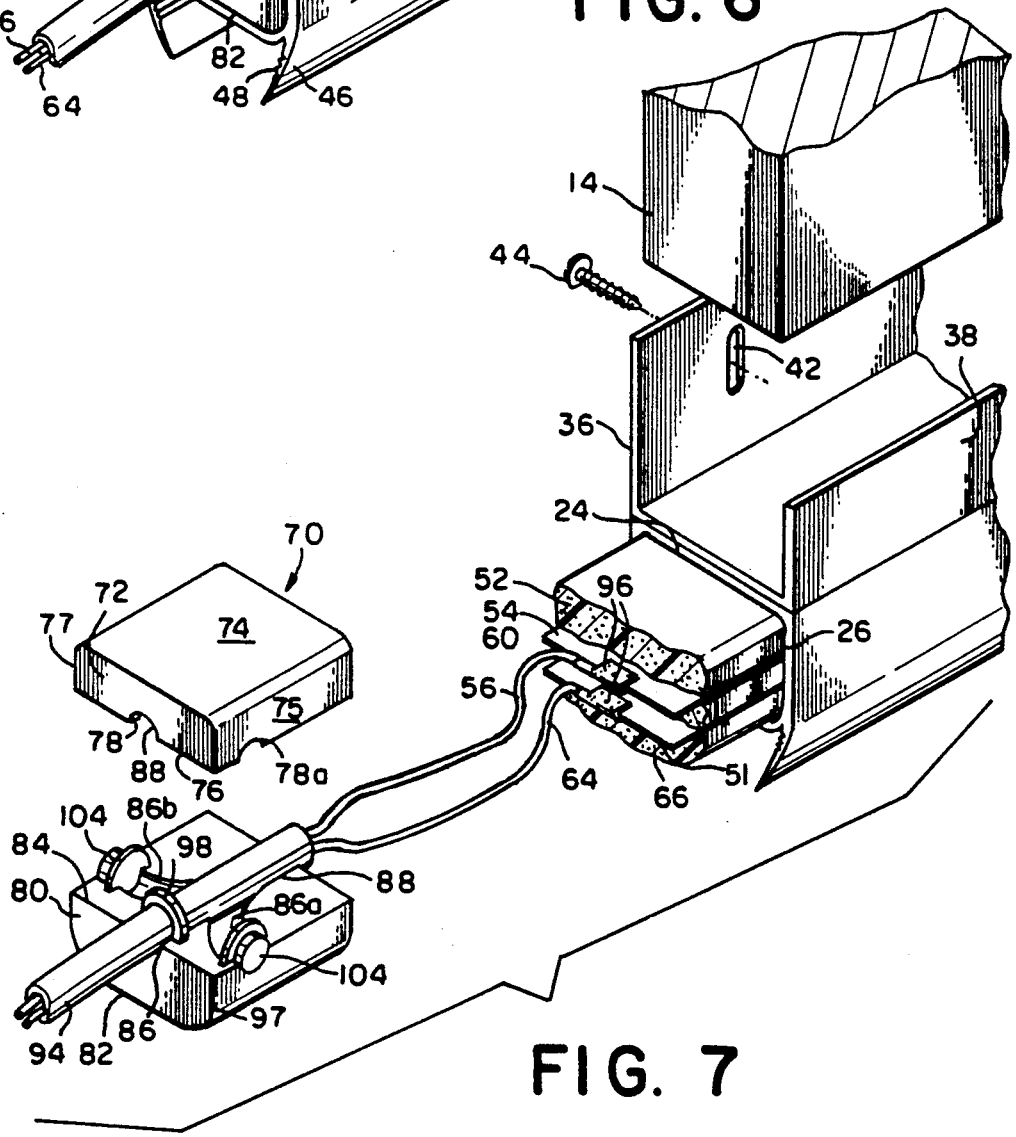
FIG. 7 is an exploded partial perspective view of the lower end of a portion of the door, the sensing edge and the end plug of FIG. 6.

Referring to FIGS. 6 and 7, there is shown a sensing edge 16 in accordance with an alternate embodiment of the present invention in which an end plug 70 is used to seal a first end 23 of the outer sheath 20. The end plug 70 is complementarily positioned within a gap (not shown) formed between a first end 51 of the switch means and the first end 23 of the sheath 20. The end plug 70 is shaped so that its outer periphery conforms with the interior surface of the first wall 24 and the second wall 26 of the outer sheath 20. It is to be understood by those skilled in the art that the shape of the end plug 70 is dictated by the shape formed by the interior surfaces of the first and second walls 24,26 of the outer sheath 20 and can be designed to fit any shaped gap. The end plug 70 is sized and shaped to completely fill the gap so that a tight seal is formed to prevent fluids from passing therethrough.

In the preferred embodiment, the plug 70 is retained within the gap by applying an adhesive (not shown) to the exterior surfaces of the top portion 72 and the bottom portion 80 of the end plug 70. The end plug 70 is preferably fabricated of a generally flexible material, such as a PVC, but can also be fabricated of Santoprene made by Monsanto or a combination of PVC and neoprene. Accordingly, it is understood by those skilled in the art that the end plug can be constructed of many different materials, including non-polymeric materials, such as wood or metal, without departing from the spirit and scope of the invention.

The end plug 70 comprises a top portion 72 having a first face 74 which is placed in facing engagement with the interior surface of the first wall 24 of the outer sheath 20. A second face 76 of the top portion 72 of the end plug 70 includes a main groove 78 which is generally parallel with the longitudinal axis of the sheath 20 and extends the entire length of the top portion 72. In the preferred embodiment, the main groove 78 includes two additional grooves 78a (only one is shown) which intersect the main groove 78 and extend in opposite directions from the main groove 78. The two additional grooves 78a and the main groove 78 are generally semi-circular in cross-section and form generally semi-circular openings in the side surfaces 75, 77 of the end plug 70. It is to be understood by those skilled in the art that the openings formed by the main groove 78 and the additional grooves 78a can be constructed to have many different cross-sectional shapes such as, but not limited to being triangular or rectangular in cross-section without departing from the spirit and scope of the invention.

The end plug 70 also includes a bottom portion 80 having a first face 82 which complementarily engages the interior surface of the second wall 26 of the outer sheath 20. A second face 84 of the bottom portion 80 of the end plug 70 has a main groove 86 which is complementary to the main groove 78 in the top portion 72 of the end plug 70. The second face 84 of the bottom portion 80 also includes two additional grooves 86a, 86b which intersect the main groove 86 and extend in opposite directions therefrom. The grooves 86, 86a, 86b are generally semi-circular in cross section.

When the end plug 70 is assembled, the top portion 72 and the bottom portion 80 are secured together such that the grooves 78, 78a in the top portion 72 are placed in facing engagement with the grooves 86, 86a, 86b of the bottom portion. When the top portion 72 and the bottom portion 80 of the end plug 70 are engaged as shown in FIG. 6, the complementary main grooves 78, 86 form a passageway 88 which extends through the end plug 70 and forms a generally circular opening 90. It is to be understood by those skilled in the art that the opening 90 may be formed in any portion of the end plug 70 including the side surfaces 75, 77 of the end plug 70.

The top portion 72 and the bottom portion 80 of the end plug 70 are preferably secured to one another by an adhesive. It is understood by those skilled in the art that the top portion 72 and the bottom portion 80 of the end plug 70 can be secured to one another by other means such as a standard fastener or cooperating interlocking elements which permit the top and bottom portions 72, 80 to be snapped together.

Referring now to FIG. 7, electrical wires 56, 64 are connected to the switch means and extend through the passageway 88 formed within the end plug 70. In the preferred embodiment, the electrical wires 56, 64 are connected to the first sheet of electrically conductive material 54 and the second sheet of electrically conductive material 60 by standard crimp connectors 96 which clamp onto the sheets. It is to be understood by those skilled in the art that the electrical wires 56, 64 can be attached to the switch means in any conventional manner, including, but not limited to, being soldered onto the sheets or by means of a clamp. A portion of the electrical wires 56, 64 are encased in a cable 94 which is complementarily sized so as to be fixably received within the passageway 88. In the preferred embodiment, the cable 94 is adhesively secured to the bottom portion 80 of the end plug 70, however, the cable 94 can be secured within the passageway 88 by any suitable means, such as, a snap fit or by friction.

As discussed above, the cable 94 extends through the passageway 88 and is connected to a power source (not shown). An insulating ring 98 acts as a sealing means to provide a tight seal at the point where the cable 94 extends through the opening 90 of the passageway 88. The insulating ring 98 acts to form a seal between the cable 94 and the passageway 88 to prevent the entry of water and small particles, such as dust, into the passageway 88 of the end plug 70 which could affect the switch means. The insulating ring is seated in an indent 97 in the end plug 70 which is located proximate to the opening 90 of the passageway 88.

As discussed above, in addition to the main passageway 88, there exist four additional grooves 78a, 86a, 86b which form two auxiliary passageways which extend in opposite directions from the main passageway 88. In a case such as described above, the cable 94 extends through the main passageway 88 and opening 90 of the end plug 70. However, the cable 94 can also extend through one of the auxiliary passageways (not shown). For instance, in the event that there is not enough space between the edge of the door 14 and the doorway 12, the cable 94 will not be able to exit from the main passageway 88. If an auxiliary passageway is used, a hole equal to the size of the opening of the chosen passageway must be made in a portion of the outer sheath 20 corresponding to the position of the auxiliary passageway opening. In the preferred embodiment, the auxiliary passageway facing the inner surface of the door 14 would be chosen to prevent tampering with the electrical wires 56, 64 of the sensing edge 16 by a possible intruder.

In order to prevent the entrance of liquids and small particles into the auxiliary passageways of the end plug 70, a blocking means in the form of a stopper 104 is placed in the opening of each unused passageway. The stopper 104 is sized so as to be fixedly received by the opening of the auxiliary passageway. An insulating ring 98 is securely placed around the outer circumference of each stopper 104 in order to provide a tight seal within the auxiliary passageway. The insulating ring 98 is seated in an indent 97 which is located proximate to the opening of each auxiliary passageway.

The end plug 70 is assembled and attached to the sensing edge 16 in the following manner. The switch means 30 is placed within the outer sheath 20 such that a gap is formed between the first end of the switch means 51 and the first end of the outer sheath 23. A pair of electrical wires 56, 64 are attached to the switch means 30 by crimp connectors 96. The electrical wires are partially encased in an insulated cable 94. An insulating ring 98 is placed around the outer circumference of the cable 94. An adhesive is applied to a portion of the cable 94. The cable 94 is secured within the main groove 86 of the bottom portion 80 of the end plug 70 such that the insulating ring 98 is received by an indent 97 located within the plug 70. The cable 94 is secured within the main groove 78 by a friction fit.

A stopper 104 is placed in the opening of each auxiliary groove 86a, 86b of the bottom portion 80 of the end plug 70. An adhesive is applied to the second face 76 of the top portion 72 of the end plug 70 and is attached to the second face 84 of the bottom portion 80 of the end plug 70 such that the grooves 78, 86 are complementarily aligned to form a passageway 88. An adhesive is applied to the outer surfaces of the end plug 70. The assembled end plug 70 is inserted within the gap such that the outer surfaces of the end plug 70 are adhered to the inner surfaces of the first wall 24 and the second wall 26 of the outer sheath 20.

The end plug 70 acts to secure the electrical wires 56, 64 to the switch means 30 so that the wires 56, 64 cannot easily be removed such as by tugging at the wires 56, 64 or cable 94. The end plug 70 also ensures that contaminants, such as fluids or small particles, do not enter the sensing edge 16. The end plug 70 further prevents tampering with the switch means 30.

From the foregoing description, it can be seen that the present invention comprises a sensing edge for causing a closing door to open by actuation of a device upon force being applied to the sensing edge. The presence of slots in the protruding walls which extend from the sheath allows the sensing edge to be adjustably positioned with respect to the door edge. In addition, the presence of one or more flexible members, extending from the sheath provide a door seal and prevent the sheath from being accidentally actuated when the door is in a closed position. It will be appreciated by those skilled in the art, that changes could be made to the embodiment described above without departing from the broad inventive concepts thereof. It is understood, therefore, that this invention is not limited to the particular embodiment disclosed, but is intended to cover all modifications which are within the scope and spirit of the invention as defined by the appended claims.

I claim:

1. A sensing edge for causing a closing door to open by actuation of a device upon force being applied to the sensing edge, the sensing edge comprising:

an elongate outer sheath having a first wall and a second wall, said first and second walls each having a first end and a second end, the first end of the first wall being connected to the first end of the second wall, the second end of the first wall being connected to the second end of the second wall, each of the walls including an interior surface and an exterior surface, said first wall including a first portion fabricated of a first material and a second portion fabricated of a second material, said second material being less flexible than said first material, said first wall including a first protruding means and a second protruding means extending from said exterior surface thereof for receiving therebetween an edge of the door, said second wall being compressible upon application of an external pressure and fabricated of a flexible air impervious material; and switch means positioned within an area defined by the interior surfaces of the first and second walls for actuation of the device upon application of external pressure to the outer sheath.

2. A sensing edge according to claim 1, wherein said first and second protruding means are generally parallel and are fabricated of said second material, said first protruding means being spaced from said second protruding means a sufficient distance for complementarily receiving the door edge.

3. A sensing edge according to claim 2, wherein said first protruding means comprises a mounting wall extending outwardly from said first wall for engagement with said door, said mounting wall including at least one generally oblong slot such that a fastener can be extended through said slot and into engagement with said door for adjustably mounting said sensing edge on said door edge.

4. A sensing edge according to claim 1, wherein said switch means further comprises:

a first sheet of resiliently compressible material having a first face and a second face, the first face of the first sheet of resiliently compressible material being in engagement with the interior surface of the first wall;

a first sheet of flexible, electrically conductive material having a first face and a second face, the first face of the first sheet of flexible, electrically conductive material being in engagement with the second face of the first sheet of resiliently compressible material;

a layer of non-conductive material having a first face and a second face, the first face of the layer of non-conductive material being in engagement with the second face of the first sheet of flexible, electrically conductive material, the layer of non-conductive material including at least one opening extending therethrough between the first and second faces thereof;

a second sheet of flexible, electrically conductive material having a first face and a second face, the first face of the second sheet of flexible, electrically conductive material being in engagement with the second face of the layer of non-conductive material, the first and second sheets of flexible, electrically conductive material being spaced apart by the layer of non-conductive material and presenting opposed portions to each other through the opening; and a second sheet of resiliently compressible material having a first face and a second face, the first face of the second sheet of resiliently compressible material being in engagement with the second face of the second sheet of flexible, electrically conductive material, the second face of the second sheet of resiliently compressible material being in engagement with the interior surface of the second wall whereby upon the application of force to the second wall of the sheath, a portion of at least one of the first and second sheets of flexible, electrically conductive material deflects into the opening in the layer of non-conductive material and makes electrical contact between the first and second sheets of flexible, electrically conductive material to thereby actuate the device.

5. A sensing device for causing a closing door to open by actuation of a device upon force being applied to the sensing edge, the sensing edge comprising:

an elongate outer sheath for being mounted to an edge of a door, said sheath being fabricated of a material which is compressible upon application of external pressure, said sheath having an interior surface and an exterior surface;

a flexible member extending outwardly from the exterior surface of said sheath generally away from said door when the sheath is mounted to said door, the flexible member having an inner surface, an outer surface, a first end connected to said exterior surface of s said sheath and a second end to abut an adjacent surface and form a seal between the sensing device and the adjacent surface when said door is in a closed position and the sheath is attached to said door; and switch means positioned within an area defined by the interior surface of said sheath for actuation of the device upon application of external pressure to the exterior surface of the sheath.

6. The sensing device of claim 5, further comprising a second flexible member extending outwardly from the exterior surface of said sheath generally away from said door when the sheath is attached to said door and toward the first flexible member, the second flexible member having an inner surface, an outer surface, a first end connected to said exterior surface of said sheath, and a second end to abut an adjacent surface and form a seal between the sensing device and the adjacent surface when said door is in a closed position and the sheath is attached to said door.

7. A sensing edge according to claim 6, wherein said first and second flexible members gradually decrease in thickness from said first end to said second end.

8. A sensing edge according to claim 6, wherein said first and second flexible members are generally arcuate in cross-section.

9. A sensing edge according to claim 6, further including at least one groove positioned on the inner surface of each of said first and second flexible members for increasing the flexibility of each of said first and second flexible members.

10. A sensing edge according to claim 9, wherein said groove is V-shaped in cross-section.

11. A sensing edge according to claim 5, wherein said switch means further comprises:

a first sheet of resiliently compressible material having a first face and a second face, the first face of the first sheet of resiliently compressible material being in engagement with a portion of the interior surface of said sheath;

a first sheet of flexible, electrically conductive material having a first face and a second face, the first face of the first sheet of flexible, electrically conductive material being in engagement with the second face of the first sheet of resiliently compressible material;

a layer of non-conductive material having a first face and a second face, the first face of the layer of non-conductive material being in engagement with the second face of the first sheet of flexible, electrically conductive material, the layer of nonconductive material including at least one opening extending therethrough between the first and second faces thereof;

a second sheet of flexible, electrically conductive material having a first face and a second face, the first face of the second sheet of flexible, electrically conductive material being in engagement with the second face of the layer of non-conductive material; and a second sheet of resiliently compressible material having a first face and a second face, the first face of the second sheet of resiliently compressible material being in engagement with the second face of the second sheet of flexible, electrically conductive material, the second face of the second sheet of resiliently compressible material being in engagement with another portion of the interior surface of the sheath, the first and second sheets of flexible, electrically conductive material being spaced apart by the layer of non-conductive material and presenting opposed portions to each other through the opening whereby upon the application of force to the exterior surface of the sheath, a portion of at least one of the first and second sheets of flexible, electrically conductive material deflects into the opening in the layer of non-conductive material and makes electrical conduct between the first and second sheets of flexible, electrically conductive material to thereby actuate the device.

12. A sensing edge for causing a closing door to open by actuation of a device upon force being applied to the sensing edge, the sensing edge comprising:

an elongate outer sheath for being mounted to an edge of a door, said sheath being fabricated of a material which is compressible upon application of external pressure, said sheath having an interior surface and an exterior surface;

switch means positioned within an area defined by the interior surface of said sheath for actuation of the device upon application of external pressure to the outer sheath; and first protruding means extending from said exterior surface of said sheath for engagement with the edge of the door, said first protruding means including at least one generally oblong slot such that a fastener can be adjustably positioned through said slot into engagement with said door for adjustably mounting said door edge.

13. A sensing edge according to claim 12, further including a second protruding means extending from said exterior surface of said sheath for engagement with the edge of the door, said second protruding means being spaced from said first protruding means a sufficient distance for complementarily receiving the door edge.

14. A sensing edge for causing a closing door to open by actuation of a device upon force being applied to the sensing edge, the sensing edge comprising:
   an elongate outer sheath having a first wall and a second wall, said first and second walls each having a first end and a second end, said first end of the first wall being connected to the first end of said second wall, said second end of said first wall being connected to the second end of said second wall, a portion of said first wall and said second wall being fabricated of a first material which is compressible upon application of external pressure, each of the walls including an interior surface and an exterior surface, another portion of said first wall being fabricated of a second material, said second material being less flexible than said first material, said first wall including first protruding means and second protruding means extending from the exterior surface of said first wall for receiving therebetween an edge of the door, said first and second protruding means being fabricated of said second material, said first protruding means being spaced from said second protruding means a sufficient distance for complementarily receiving an edge of the door;
   a flexible member extending from the exterior surface of said second wall generally away from the door, the flexible member having an inner surface, an outer surface, a first end connected to the exterior surface of said second wall and a second end to abut an adjacent surface and form a seal between the sensing edge and the adjacent surface when the door is in a closed position, said flexible member gradually decreasing in thickness from said first end to said second end, said inner surface of said flexible member including at least one groove positioned therein for increasing the flexibility of the flexible member; and
   switch means positioned within an area defined by the interior surfaces of the first and second walls for actuation of the device upon application of external pressure to the outer sheath.

15. A sensing edge according to claim 14, wherein said first protruding means includes a series of slots located along the length of said first protruding means, said slots being oblong and extending generally perpendicular with respect to said first wall, wherein fasteners can be extended through said slots and into engagement with said door for adjusting the mounting position of said sensing edge with respect to the door edge.

16. The sensing device of claim 14, further comprising a second flexible member extending from the exterior surface of said second wall generally away from the door and toward the first flexible member, the second flexible member having an inner surface, an outer surface, a first end connected to the exterior surface of said second wall, and a second end to abut an adjacent surface and form a seal between the sensing edge and the adjacent surface when the door is in a closed position, said second flexible member gradually decreasing in thickness from said first end to said second end of said second flexible member, said inner surface of said second flexible member including at least one groove positioned therein for increasing the flexibility of said second flexible member.

17. A method for attaching a sensing edge to an edge of a door, said sensing edge causing a closing door to open by actuation of a device upon force being applied to the sensing edge, said method comprising the steps of:
   providing a sensing edge having an elongate outer sheath for being mounted to an edge of a door, said sheath being fabricated of a material which is compressible upon application of external pressure, said sheath having an interior surface and an exterior surface, said interior surface of the sheath defining an area for receiving a switch means, said sheath including protruding means extending from said exterior surface thereof for engagement with the edge of the door, said protruding means includes one or more generally oblong slots;
   positioning the sensing edge on the edge of the door such that a portion of the exterior surface of said sheath is in facing engagement with the edge of the door and said door is positioned proximate said protruding means;
   positioning a fastener through at least one of said slots into engagement with said door such that said sensing edge can move with respect to said door edge;
   positioning the door in a closed position such that the door edge is proximate a surface;
   adjusting the position of the sensing edge relative to the door so that a portion of the exterior surface of the sheath is in complementary engagement with the surface; and
   adjusting the position of said fastener with respect to said door such that the position of the sensing edge with respect to said door is fixed.

18. A sensing edge for causing a closing door to open by actuation of a device upon force being applied to the sensing edge, the sensing edge comprising:
   an elongate outer sheath having a first end and a second end for being attached to an edge of a door, said sheath being fabricated of a material which is compressible upon application of external pressure, said sheath having an interior surface and an exterior surface;
   switch means positioned within an area defined by the interior surface of said sheath for actuation of the device upon application of external pressure to the exterior surface of the sheath, said switch means having a first end and a second end and being positioned within the area of said sheath such that a gap is formed between the first end of said switch means and said first end of said outer sheath;
   electrical conducting means attached to and extending from said first end of said switch means for controlling the actuation of the device n response to the application of force to the outer sheath; and
   at least one end plug complementarily positioned with the gap between said first end of said switch means and said first end of said outer sheath for sealing the first end of the outer sheath, said plug having a passageway formed therethrough, said electrical conducting means extending through and being positioned within the passageway such that the electrical conducting means is securely retained within said passageway, said end plug further comprising a top portion and a bottom portion having complementary grooves in facing relationship to form the passageway.

19. A sensing edge according to claim 18, wherein said passageway branches into a plurality of auxiliary passageways which extend in relatively different directions.

20. A sensing edge according to claim 19, wherein said electrical conducting means is located within said passageway and extends through at least one of said auxiliary passageways.

21. A sensing edge according to claim 20, wherein said end plug further comprises blocking means for blocking and sealing the other of said auxiliary passageways.

22. A sensing edge according to claim 18, further comprising sealing means for providing a seal between said electrically conducting means and said auxiliary passageway such that said sealing means prevents the entry of extraneous matter into said plug.

* * * * *